United States Patent
Sekizuka

(10) Patent No.: US 7,625,007 B2
(45) Date of Patent: Dec. 1, 2009

(54) AIRBAG DEVICE FOR VEHICLE

(75) Inventor: Makoto Sekizuka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 314 days.

(21) Appl. No.: 11/706,958

(22) Filed: Feb. 16, 2007

(65) Prior Publication Data

US 2007/0187932 A1   Aug. 16, 2007

(30) Foreign Application Priority Data

Feb. 16, 2006   (JP) .............................. 2006-039289

(51) Int. Cl.
*B60R 21/276* (2006.01)

(52) U.S. Cl. ..................................... 280/739
(58) Field of Classification Search .............. 280/730.1, 280/739, 729, 743.1
See application file for complete search history.

(56) References Cited

U.S. PATENT DOCUMENTS

| | | | |
|---|---|---|---|
| 6,536,800 B2 | 3/2003 | Kumagai et al. | |
| 7,000,943 B2 | 2/2006 | Hasebe et al. | |
| 7,226,077 B2 * | 6/2007 | Abe | 280/736 |
| 2004/0051281 A1 * | 3/2004 | Miyata | 280/730.1 |
| 2005/0173898 A1 * | 8/2005 | Yoshikawa et al. | 280/729 |
| 2006/0163848 A1 * | 7/2006 | Abe | 280/729 |
| 2007/0187932 A1 * | 8/2007 | Sekizuka | 280/730.1 |

FOREIGN PATENT DOCUMENTS

| | | |
|---|---|---|
| JP | 02-132555 | 1/1992 |
| JP | 10-203280 | 8/1998 |
| JP | 11-005505 | 1/1999 |
| JP | 2000-118341 | 4/2000 |
| JP | 2000-159045 | 6/2000 |
| JP | 2001-233157 | 8/2001 |
| JP | 2003-054353 | 2/2003 |
| JP | 2003-335203 | 11/2003 |
| JP | 2004-244005 | 9/2004 |
| JP | 2004-256016 | 9/2004 |
| JP | 2005-088681 | 4/2005 |
| JP | 2005-199961 | 7/2005 |
| JP | 2005-206067 | 8/2005 |
| JP | 2005-247118 | 9/2005 |
| JP | 2005-280470 | 10/2005 |

* cited by examiner

*Primary Examiner*—Paul N Dickson
*Assistant Examiner*—Karen Jane J Amores
(74) *Attorney, Agent, or Firm*—Finnegan, Henderson, Farabow, Garrett & Dunner, LLP

(57) ABSTRACT

An airbag device for a vehicle includes a gas supply portion, an airbag body, and a low-pressure portion. When a vehicle collision occurs, the gas supply portion injects gas into an airbag body. The airbag body has a single-chamber structure. When the airbag body receives the gas from the gas supply portion, the airbag body is inflated and deployed toward an occupant to restrain the shoulders of the occupant. The low-pressure portion is provided in the same area of the airbag body, which faces the occupant when the airbag body is inflated and deployed, to protect the occupant's head. When the airbag body is inflated and deployed, the low-pressure portion is inflated such that the pressure in the low-pressure portion is lower than the pressure in the airbag body.

6 Claims, 5 Drawing Sheets

AIRBAG DEVICE FOR VEHICLE

INCORPORATION BY REFERENCE

The disclosure of Japanese Patent Application No. 2006-039289 filed on Feb. 16, 2006 including the specification, drawings and abstract is incorporated herein by reference in its entirety.

BACKGROUND OF THE INVENTION

1. Field of the Invention

The invention relates to an airbag device for a vehicle, which includes an airbag that is deployed toward an occupant when a collision occurs.

2. Description of the Related Art

Japanese Patent Application Publication No. JP-A-2001-233157 describes a passenger-side airbag device, in which a recess is formed beforehand in the area of an airbag that contacts the occupant's head when the airbag is deployed. Thus, the reaction force applied to the occupant's head is reduced.

However, in the above-described passenger-side airbag device, for example, the shape of bag foundation fabric (the shape of the cut bag foundation fabric) needs to be changed, or the airbag needs to be divided into a plurality of bags, to form the recess beforehand. Thus, the structure of the airbag is complicated.

SUMMARY OF THE INVENTION

A first aspect of the invention relates to an airbag device for a vehicle that includes a gas supply portion, an airbag body, and a low-pressure portion. When a vehicle collision occurs, the gas supply portion injects gas. The airbag body has a single-chamber structure. When the airbag body receives the gas from the gas supply portion, the airbag body is inflated and deployed toward an occupant to restrain at least both shoulders of the occupant. The low-pressure portion is provided in the area of the airbag body that faces the occupant when the airbag body is inflated and deployed to protect the occupant's head. When the airbag body is inflated and deployed, the low-pressure portion is inflated such that the pressure in the low-pressure portion is lower than the pressure in the airbag body.

According to the first aspect, when a vehicle collision occurs, the gas supply portion injects gas into the airbag body. Thus, the airbag body, which has a single-chamber structure, is inflated and deployed toward the occupant to restrain at least both shoulders of the occupant.

In the above-described aspect, when the airbag is inflated and deployed, the low-pressure portion is inflated such that the pressure in the low-pressure portion is lower than the pressure in the airbag body. The inflated low-pressure portion receives the occupant's head to absorb collision energy applied to the occupant's head when a vehicle collision occurs. Because the pressure in the low-pressure portion is lower than the pressure in the airbag body, the reaction force applied to the occupant's head is reduced.

That is, according to the above-described aspect, the airbag body securely restrains the shoulders of the occupant, and the low-pressure portion softly receives the occupant's head to reduce the reaction force applied to the occupant's head and neck.

Further, in the above-described aspect, the airbag body has a single-chamber structure, and the low-pressure portion is provided in the area of the airbag body that faces the occupant when the airbag body is inflated and deployed. Therefore, a conventional airbag may be used for the airbag body. Thus, unlike the art described in the above-described Japanese Patent Application Publication No. JP-A-2001-233157, the shape of the cut bag foundation fabric does not need to be changed. Accordingly, there is no need change the process of sewing the airbag body, and the process of combining a plurality of bags is not necessary. Thus, the structure of the airbag body is very simple.

As described above, the airbag device for a vehicle according to the first aspect of the invention reduces the reaction force applied to the occupant's head and neck while restraining the shoulders of the occupant. Further, the structure of the airbag body is simplified.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF THE INVENTION

Figure 1:
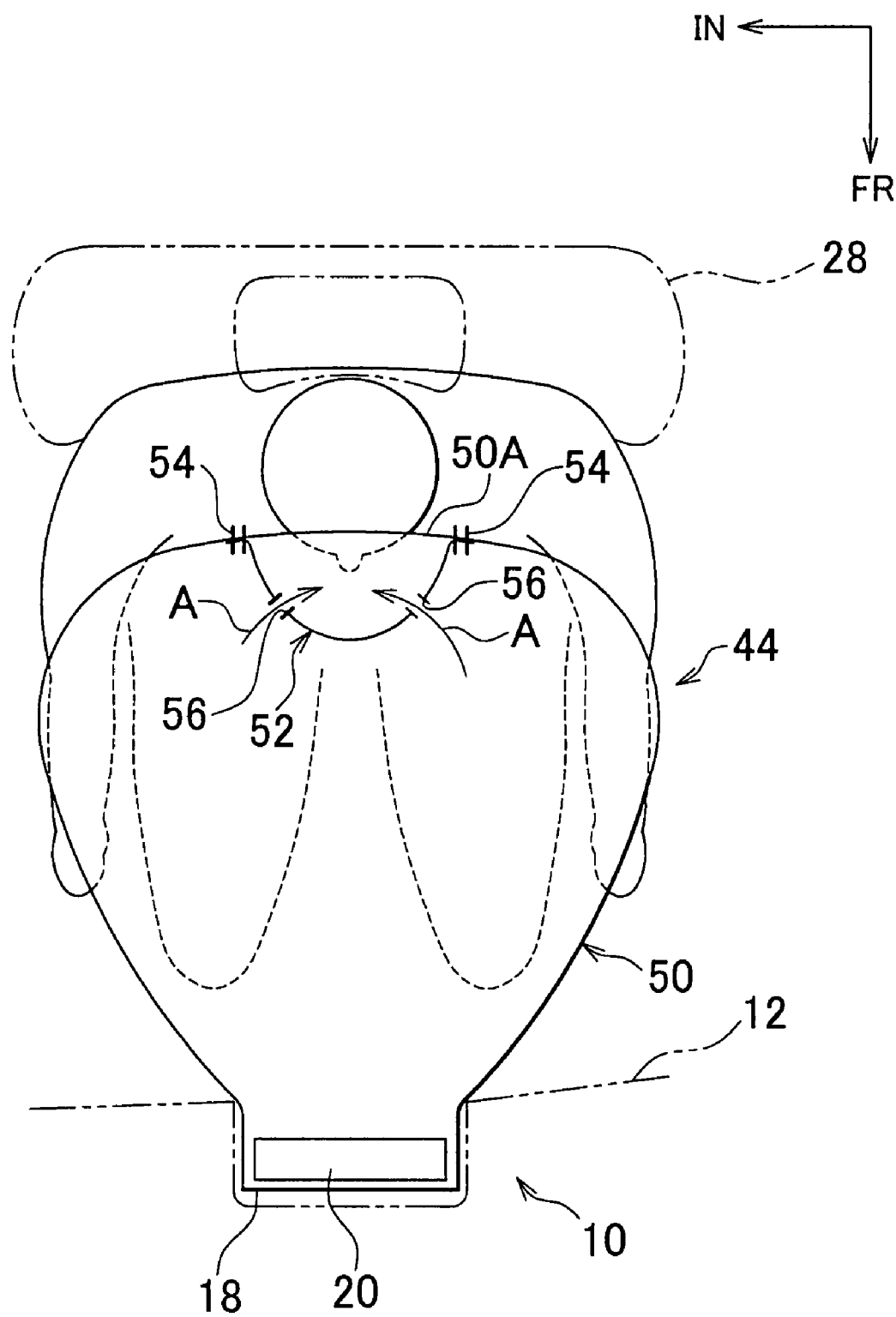
FIG. 1 is a plan sectional view showing a deployed passenger-side airbag device according to a first embodiment of the invention.

Hereinafter, an airbag device for a vehicle according to a first embodiment of the invention will be described with reference to FIG. 1 to FIG. 4. In the drawings, arrow FR points to the front of the vehicle, arrow UP points up with respect to the vehicle, and arrow IN points to the inside of the vehicle in the vehicle width direction.

Figure 2:
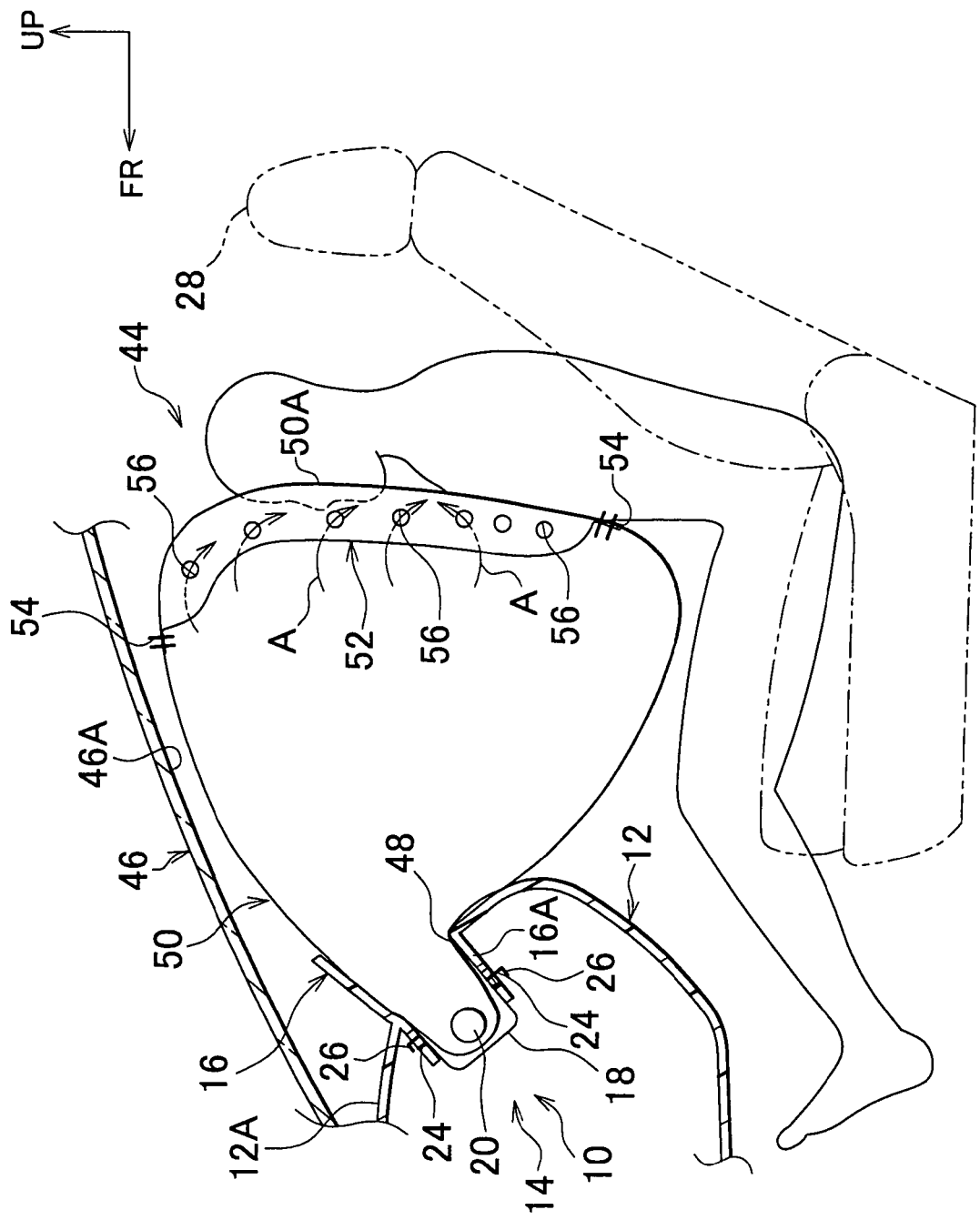
FIG. 2 is a vertical sectional view showing the deployed passenger-side airbag device, shown in FIG. 1.
Figure 3:
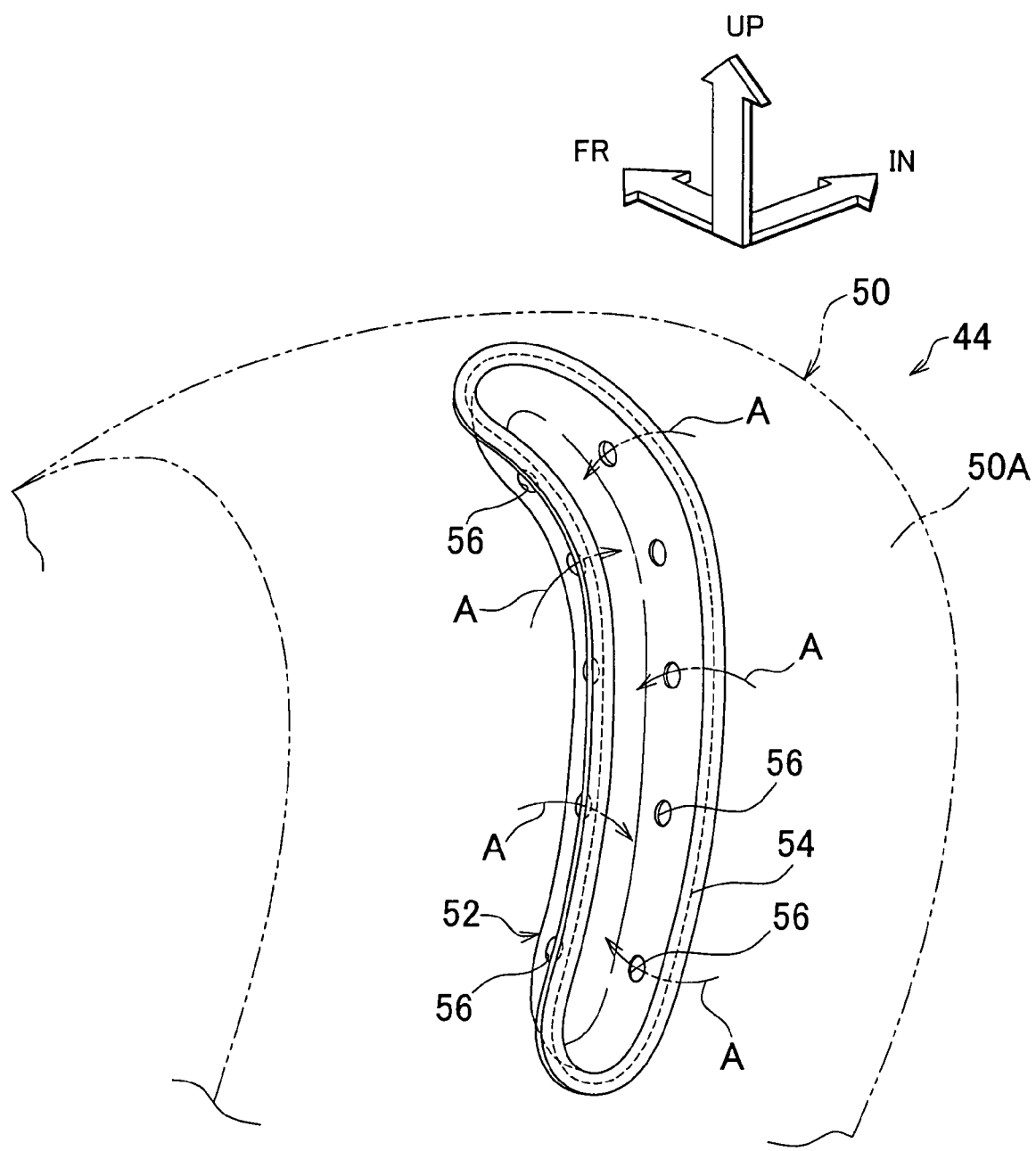
FIG. 3 is an enlarged perspective view showing the main part of the passenger-side airbag device according to the first embodiment of the invention.

FIG. 1 shows the plan cross-sectional structure of a deployed passenger-side airbag device 10, which is regarded as the airbag device for a vehicle according to the embodiment. FIG. 2 shows the vertical sectional structure of the deployed passenger-side airbag device 10. FIG. 3 is a perspective view showing the main part of the passenger-side airbag device 10 according to the embodiment.

As shown in FIG. 1 to FIG. 3, the passenger-side airbag device 10 is arranged on the passenger side of the upper surface 12A of an instrument panel 12. This passenger-side airbag device 10 mainly includes an airbag module 14 housing functioning components, and an airbag door 16 that closes the open portion at the upper end of the airbag module 14. The airbag module 14 includes a module case 18 with an open upper side, which houses functioning components, a generally column-shaped inflator 20 that functions as a gas supply portion that is housed in the module case 18, and the passenger-side airbag 44, which is stored folded up, around the inflator 20. Depending on the device, a diffuser (i.e., rectifying portion) to rectify the gas may also be arranged between the inflator 20 and the passenger-side airbag 44. The shape of the inflator 20 is not limited to the substantially columnar shape. The inflator 20 may have substantially disc shape.

The functioning components are as follows. The inflator 20 used may be either a gas-generating agent filled inflator or a high-pressure gas filled inflator. Also, the inflator 20 used may be either an electrical ignition type inflator or a mechanical ignition type inflator. In this example embodiment, an electrical ignition type inflator is used. The electrical ignition type inflator 20 includes an igniter (not shown). An airbag ECU (not shown), which is disposed, for example, below but near a console box, controls the igniter. That is, if a frontal collision is detected by a front airbag sensor or a center airbag sensor or the like (or if a frontal collision is predicted by a pre-crash sensor using millimeter-wave radar or the like arranged near the center of a front bumper), the airbag ECU determines that airbag operation is necessary and thus supplies a predetermined current to the igniter.

Also, a plurality of gas injection holes for injecting gas is formed in a predetermined position in the peripheral wall portion of the inflator 20. The gas injected from the gas injection holes flows into the passenger-side airbag 44 after being rectified by the diffuser. In this embodiment, the inflator 20 is inserted in the passenger-side airbag 44. However, the invention is not limited to this configuration. For example, the diffuser may be arranged inside the peripheral edge of the open portion, through which gas flows, that is formed in the passenger-side airbag 44, and the passenger-side airbag 44 may be arranged so that the upper half of the inflator 20, which is fixed to the bottom portion of the module case 18, is covered by the diffuser. Any structure may be employed here as long as the gas injected from the inflator 20 flows into the passenger-side airbag 44.

The module case 18 is supported via a bracket (not shown), by an instrument panel reinforcement that is a very strong and highly rigid member arranged along the vehicle width direction in the instrument panel 12.

The airbag door 16 used may be either a door that is integrated with the instrument panel 12 or a separate door that fits into an opening formed in the instrument panel 12. A tear line that functions as a breaking portion for opening the airbag door 16 and deploying the airbag is formed in the front or back surface of the instrument panel 12. When a bag expansion pressure of a predetermined value or more is applied to the airbag door 16, the instrument panel 12 tears along the tear line so that it opens in one or more sections. A leg portion 16A is integrally formed on the back-side of the airbag 16 and a retaining hole 24 is formed in this leg portion 16A. A hook 26 is formed corresponding to that retaining hole 24 on the upper end side of the module case 18. The upper-side of the module case 18 is closed by the airbag door 16 by inserting the hook 26 into the retaining hole 24 so that it is retained.

The structure of the passenger-side airbag 44, which is the main part of the passenger-side airbag device 10 according to the invention, will be described in detail.

As shown in FIG. 1 and FIG. 2, the passenger-side airbag 44 includes an airbag body 50, and a low-pressure portion 52. The passenger-side airbag body 50 has a single-chamber structure. The low-pressure portion 52 is provided in the occupant-side area 50A of the airbag body 50 (i.e., the area of the airbag body 50 that faces the occupant when the airbag body 50 is inflated and deployed). The low-pressure portion 52 is provided in the middle position in the bag width direction. The low-pressure portion 52 extends in the bag height direction. That is, the low-pressure portion 52 is positioned to protect the occupant's head in the event of a frontal collision.

As shown in FIG. 3, the entire peripheral portion of the low-pressure portion 52 is sewn to the airbag body 50. The entire peripheral portion of the low-pressure portion 52 may adhere to the airbag body 50. A plurality of pairs of right and left communication holes 56 is formed inside the sewn portion 54 of the low-pressure portion 52 in the bag height direction. Each communication hole 56 extends through the foundation fabric of the low-pressure portion 52 in the thickness direction (in the vehicle-width direction). The communication holes 56 provide communication between the area inside the airbag body 50 and the area inside the low-pressure portion 52. When the passenger-side airbag 44 is inflated and deployed, the pressure in the low-pressure portion 52 is a half or one third of the pressure in the airbag body 50.

Next, the effects of the embodiment will be described.

First, the overall operation of the passenger-side airbag device 10 according to the embodiment will be described. If a frontal collision is detected by a front airbag sensor or a center airbag sensor or the like (not shown), or if a frontal collision is predicted by a pre-crash sensor, the airbag ECU operates the inflator 20. Then, the gas is injected from the plurality of gas injection holes formed in the peripheral wall portion of the inflator 20. The injected gas flows into the passenger-side airbag 44 after being rectified by the diffuser. As a result, the passenger-side airbag 44 is inflated. When the pressure in the passenger-side airbag 44 reaches the predetermined value, the instrument panel 12 tears along the tear line, and the airbag door 16 opens toward the inner surface 46A of the windshield 46. When the airbag door 16 opens, the opening 48 is formed on the upper surface 12A of the instrument panel 12. The passenger-side airbag 44 protrudes toward the passenger seat 28 through the opening 48.

In the passenger-side airbag device 10 according to the embodiment, the low-pressure portion 52 is provided in the occupant-side area 50A of the airbag body 50 to protect the occupant's head. Therefore, after the airbag body 50 is inflated and deployed, the gas flows into the low-pressure portion 52 through the plurality of communication holes 56 (as shown by arrows A in FIG. 1 to FIG. 3). Thus, after the airbag body 50 is inflated and deployed, the low-pressure portion 52 is inflated. The amount of gas that flows into the low-pressure portion 52 may be changed by changing the diameter of the communication holes 56 and/or the number of communication holes 56. Thus, the low-pressure portion 52 is inflated such that the pressure in the low-pressure portion 52 is lower than the pressure in the airbag body 50. The inflated low-pressure portion 52 receives the occupant's head to absorb collision energy applied to the occupant's head when a frontal collision occurs. When the passenger-side airbag 44 is deployed, because the pressure in the low-pressure portion 52 is lower than the pressure in the airbag body 50, the reaction force applied to the occupant's head is reduced.

That is, according to the embodiment, the airbag body 50 securely restrains the shoulders of the occupant, and the low-pressure portion 52 softly receives the occupant's head. This reduces the load reaction force applied to the occupant's head and neck.

Further, in this embodiment, the low-pressure portion 52 is provided in the occupant-side area 50A of the airbag body 50 that has a single-chamber structure. Therefore, a conventional airbag may be used as the airbag body 50. Thus, in this embodiment, the shape of the cut bag foundation fabric does not need to be changed, unlike the related art. Accordingly, the process of sewing the passenger-side airbag 44 does not need to be changed, and the process of combining a plurality of bags is not necessary. Thus, the structure of the passenger-side airbag 44 is very simple.

Thus, the passenger-side airbag device 10 according to the embodiment reduces the reaction force applied to the occupant's head and neck while restraining the shoulders of the occupant. Further, the structure of the passenger-side airbag 44 is simplified.

In the passenger-side airbag device 10 according to the embodiment, the low-pressure portion 52 is provided in the airbag body 50 at the substantially middle position in the bag width direction. The low-pressure portion 52 extends in the bag height direction. Therefore, the low-pressure portion 52 softly protects the occupant's head and neck, regardless of the body type of the occupant. That is, when the occupant is tall, the position of the head is high. When the occupant is short, the position of the head is low. However, because the low-pressure portion 52 extends in the bag height direction, the low-pressure portion 52 has the beneficial effect on the occupants having a wide variety of heights. Accordingly, in this embodiment, the performance of protecting the occupant's head and neck is improved, regardless of the body height of the occupant.

Further, in the passenger-side airbag device 10 according to the invention, the entire peripheral portion of the low-pressure portion 52 is sewn to the airbag body 50. The plurality of communication holes 56 is formed inside the sewn portion 54. Therefore, after the airbag body 50 is inflated, the gas is supplied to the low-pressure portion 52 from the airbag body 50 through the plurality of communication holes 56, and the low-pressure portion 52 is inflated. Accordingly, the airbag body 50 is quickly deployed. Thus, according to the embodiment, the basic performance of restraining the shoulders of the occupant is appropriately maintained.

In addition, in the passenger-side airbag device 10 according to the embodiment, the plurality of communication holes 56, which is regarded as the communication portion, extends through the low-pressure portion 52 in the thickness direction (in the vehicle-width direction). Therefore, the gas in the airbag body 50 flows into the low-pressure portion 52 through the plurality of communication holes 56. Thus, by changing the diameter of the communication holes 56, and/or the number of communication holes 56, the pressure in the low-pressure portion 52 can be adjusted. Accordingly, in this embodiment, the pressure in the low-pressure portion 52 is easily adjusted.

Figure 4:
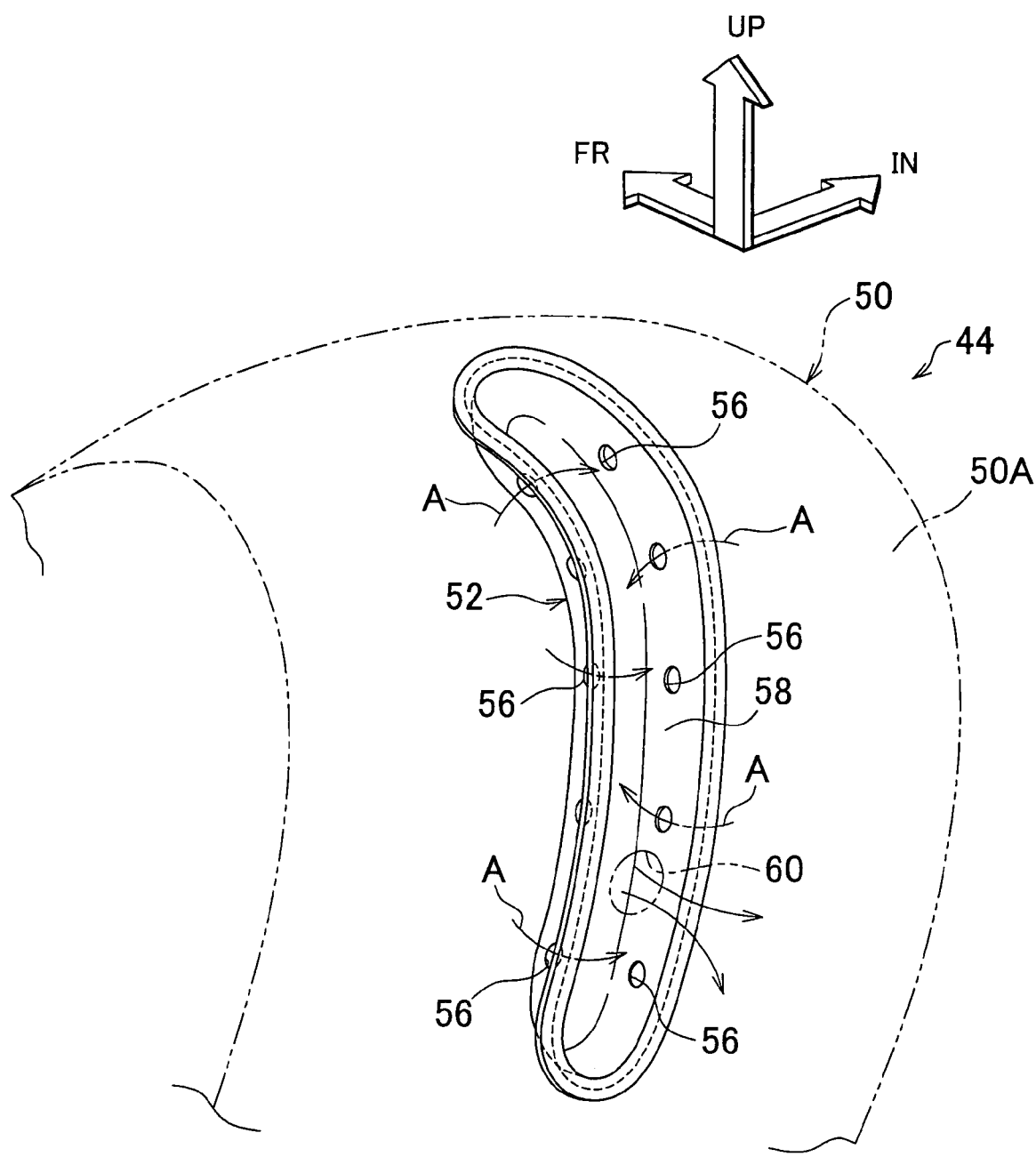
FIG. 4 is an enlarged perspective view showing a low-pressure portion according to a modified example, which corresponds to FIG. 3.

As shown in FIG. 4, a vent hole 60 may be formed in the lower area of the foundation fabric 58 of the airbag body 50. The foundation fabric 58 forms the surface of the low-pressure portion 52, which faces the occupant. The vent hole 60 provides communication between the area inside the low-pressure portion 52 and the area outside the airbag 50. In this case, when the occupant's head contacts the low-pressure portion 52, the gas in the low-pressure portion 52 is discharged through the vent hole 60. This avoids the situation where the pressure in the low-pressure portion 52 increases to an extremely high value.

Next, an airbag device for a vehicle according to a second embodiment of the invention will be described with reference to FIG. 5. The same or corresponding portions as those in the first embodiment are denoted by the same reference numerals, and description thereof will be omitted.

Figure 5:
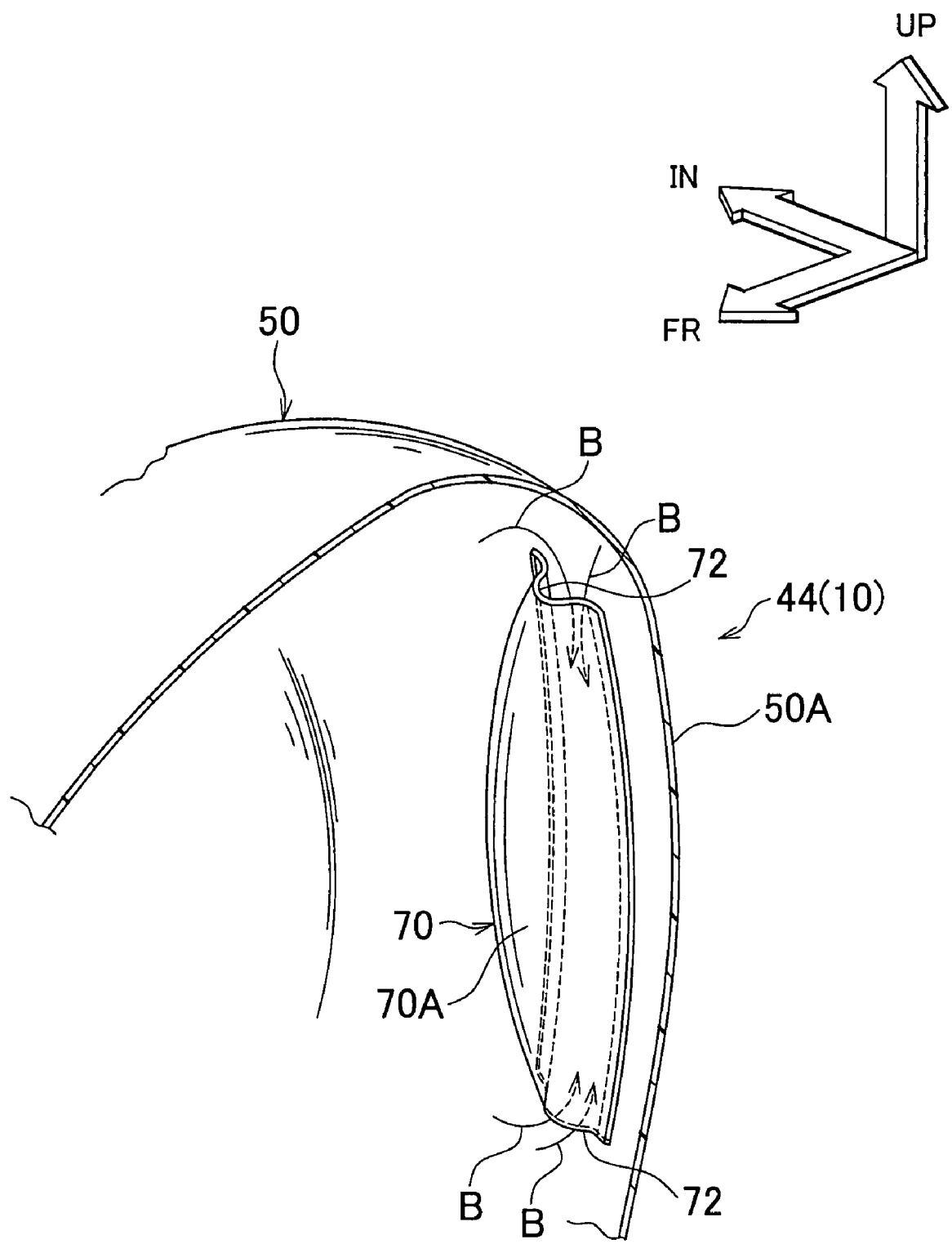
FIG. 5 is an enlarged perspective view showing the main part of an airbag device for a vehicle according to a second embodiment of the invention.

As shown in FIG. 5, in the passenger-side airbag device 10 according to the second embodiment, only both side portions in the peripheral portion of the low-pressure portion 70 are sewn to, or adhere to the airbag body 50, instead of sewing the entire peripheral portion of the low-pressure portion 70 to the airbag body 50. A gas inlet 72 is formed at each of the upper end and lower end of the low-pressure portion 70. The gas flows into the low-pressure portion 70 through the gas inlets 72. The gas inlet 72 is regarded as the communication portion.

The gas inlet 72 formed at each of the upper end and lower end of the low-pressure portion 70 is narrower than a general portion 70A.

With the above-described configuration, when a frontal collision occurs, after the gas inflates the airbag body 50, the gas flows into the low-pressure portion 70 through the gas inlets 72 to inflate the low-pressure portion 70 (as shown by the arrow B in FIG. 5). Accordingly, by changing the width of the gas inlets 72, the pressure in the low-pressure portion 70 can be appropriately adjusted. As a result, in this embodiment, the pressure in the low-pressure portion 70 is easily adjusted.

In the above-described embodiment, the gas flows into the low-pressure portion 70 through the gas inlets 72 at the upper end and lower end. However, the invention is not limited to this configuration. The upper end and the lower end of the low-pressure portion 70 may be closed, and the both side portions of the low-pressure portion 70 may be partially separated from the airbag body 50.

In each of the above-described embodiments, the invention is applied to the passenger-side airbag device 10. However, the invention is not limited to the passenger-side airbag device 10. The invention may be applied to a driver-side airbag device, for example, in the case where a lever is used in the steering structure of a vehicle, instead of a conventional steering wheel.

In the invention, the phrase "when a frontal collision occurs" is used to indicate the time when an airbag sensor detects the frontal collision of the vehicle, and the time when a collision prediction sensor, such as a pre-crash sensor, predicts the frontal collision of the vehicle with another vehicle.

Further, although the plurality of communication holes 56, or the plurality of gas inlets 72 is formed in each of the above-described embodiments, embodiments where only one communication hole 56 or only one gas inlet 72 is provided are also within the scope of the invention.

What is claimed is:

1. An airbag device for a vehicle, comprising:
a gas supply portion that injects gas when a vehicle collision occurs;
an airbag body, with a bag shape and a single-chamber structure, which is inflated and deployed toward an occupant to restrain at least both shoulders of the occupant, when the airbag body receives the gas from the gas supply portion; and
a low-pressure portion provided in a protection area in an end portion of the airbag body, which faces the occupant, wherein the low-pressure portion is provided in the airbag body at a substantially middle position in a bag width direction, and the low-pressure portion extends in a bag height direction; the low-pressure portion is formed by sewing foundation fabric to the airbag body; and the low-pressure portion is inflated such that pressure in the low-pressure portion is lower than pressure in the airbag body, when the airbag body is inflated and deployed,
wherein a gas inlet is formed in the low-pressure portion so that the low-pressure portion receives the gas from the airbag body after the airbag body is inflated and deployed, and the gas inlet is formed by forming a non-fixed portion where a part of a peripheral portion of the foundation fabric is separated from the airbag body, and forming a fixed portion where a rest of the peripheral portion of the foundation fabric is fixed to the airbag body; and
wherein the low-pressure portion is narrower than the airbag body in a bag width direction.

2. The airbag device for a vehicle according to claim 1, wherein the gas inlet is formed at each of an upper end and a lower end of the low-pressure portion, by sewing only both side portions in the peripheral portion of the low-pressure portion to the airbag body, or by causing only the both side portions to adhere to the airbag body.

3. The airbag device for a vehicle according to claim 2, wherein the gas inlet formed at each of the upper end and the lower end of the low-pressure portion is narrower than a general portion of the lower-pressure portion.

4. The airbag device for a vehicle according to claim 1, wherein a vent hole is formed in the low-pressure portion, and the vent hole provides communication between an area inside the low-pressure portion and an area outside the airbag body.

5. The airbag device for a vehicle according to claim 4, wherein the vent hole is formed in a lower area of the low-pressure portion.

6. An airbag device for a vehicle, comprising:
   a gas supply means that is operated to inject gas when a vehicle collision occurs;
   an airbag body with a bag shape and a single-chamber structure, which is inflated and deployed toward an occupant to restrain at least both shoulders of the occupant, when the airbag body receives the gas from the gas supply means; and
   a low-pressure portion provided in a protection area in an end portion of the airbag body, which faces the occupant, wherein the low-pressure portion is provided in the airbag body at a substantially middle position in a bag width direction, and the low-pressure portion extends in a bag height direction; the low-pressure portion is formed by sewing foundation fabric to the airbag body; and the low-pressure portion is inflated such that pressure in the low-pressure portion is lower than pressure in the airbag body, when the airbag body is inflated and deployed, wherein a gas inlet is formed in the low-pressure portion so that the low-pressure portion receives the gas from the airbag body after the airbag body is inflated and deployed, and the gas inlet is formed by forming a non-fixed portion where a part of a peripheral portion of the foundation fabric is separated from the airbag body, and forming a fixed portion where a rest of the peripheral portion of the foundation fabric is fixed to the airbag body; and wherein the low-pressure portion is narrower than the airbag body in a bag width direction.

* * * * *